United States Patent [19]

Stowe

[11] Patent Number: 4,997,247

[45] Date of Patent: Mar. 5, 1991

[54] FIBER OPTIC COUPLER AND METHOD FOR MAKING SAME

[75] Inventor: David Stowe, Medfield, Mass.

[73] Assignee: Aster Corporation, Milford, Mass.

[21] Appl. No.: 97,795

[22] Filed: Sep. 17, 1987

[51] Int. Cl.⁵ .................... G02B 6/26; C03B 23/20
[52] U.S. Cl. ...................... 350/96.15; 350/96.16; 350/96.29; 350/320; 65/4.1; 65/4.2; 65/4.3
[58] Field of Search .............. 350/96.10, 96.15, 96.16, 350/96.20, 96.29, 320; 65/4.1, 4.2, 4.3

[56] References Cited

U.S. PATENT DOCUMENTS

| | | | |
|---|---|---|---|
| 4,054,366 | 10/1977 | Barnoski et al. | 350/96.15 |
| 4,165,150 | 8/1979 | Duck et al. | 350/96.15 |
| 4,291,940 | 9/1981 | Kawasaki et al. | 350/96.15 |
| 4,330,170 | 5/1982 | Johnson et al. | 350/96.16 |
| 4,392,712 | 7/1983 | Ozeki | 350/96.16 |
| 4,426,215 | 6/1984 | Murphy | 65/4.21 |
| 4,439,221 | 3/1984 | Smyth et al. | 65/4.21 |
| 4,449,781 | 5/1984 | Lightstone et al. | 350/96.15 |
| 4,482,203 | 11/1984 | Stowe et al. | 350/96.15 |
| 4,490,163 | 12/1984 | Jochem et al. | 65/4.21 |
| 4,550,974 | 11/1985 | Murphy | 350/96.15 |
| 4,586,784 | 5/1986 | Tremblay et al. | 350/96.15 |
| 4,591,372 | 5/1986 | Bricheno et al. | 65/4.2 |
| 4,593,968 | 6/1986 | Giallorenzi | 350/96.15 |
| 4,612,028 | 9/1986 | Abebe et al. | 65/4.2 |
| 4,632,513 | 12/1986 | Stowe et al. | 350/96.15 |
| 4,647,146 | 3/1987 | Karr, III et al. | 350/96.15 |
| 4,726,643 | 2/1988 | Imoto et al. | 350/96.16 |
| 4,755,037 | 7/1988 | Bjornlie et al. | 350/96.15 |
| 4,756,589 | 7/1988 | Bricheno et al. | 350/96.15 |
| 4,772,085 | 9/1988 | Moore et al. | 350/96.15 |
| 4,796,968 | 1/1989 | Coccoli et al. | 350/96.15 |
| 4,801,185 | 1/1989 | Bricheno | 350/96.15 |
| 4,822,128 | 4/1989 | Imoto et al. | 350/96.16 |

FOREIGN PATENT DOCUMENTS

| | | | |
|---|---|---|---|
| 59-185308 | 10/1984 | Japan | 350/96.15 |
| WO84/04822 | 12/1984 | PCT Int'l Appl. | 350/96.15 |

OTHER PUBLICATIONS

Marcuse, *Theory of Dielectric Optical Waveguides*, (Academic Press: New York, 1974), pp. 71-79.

Primary Examiner—William L. Sikes
Assistant Examiner—Brian M. Healy
Attorney, Agent, or Firm—Fish & Richardson

[57] ABSTRACT

A fiber optic coupler has at least two optical fibers each having a core with a cladding material disposed thereabout. The fibers, in a limited length coupling region, have the cladding material removed and the core exposed, the thickness of the cladding material increasing is smooth transition from immediately adjacent the exposed core in the limited length coupling region. The fibers in the limited length coupling region are joined by coalescing. In preferred embodiments, in the limited length coupling region, a portion of the core is removed, the core diameter in the coupling region being less than the core diameter in regions adjacent thereto, the outer diameter of the core decreasing in smooth transition from immediately adjacent the cladding material. A method and product of forming these couplers or others with the fibers in crossed relationship are also described.

25 Claims, 3 Drawing Sheets

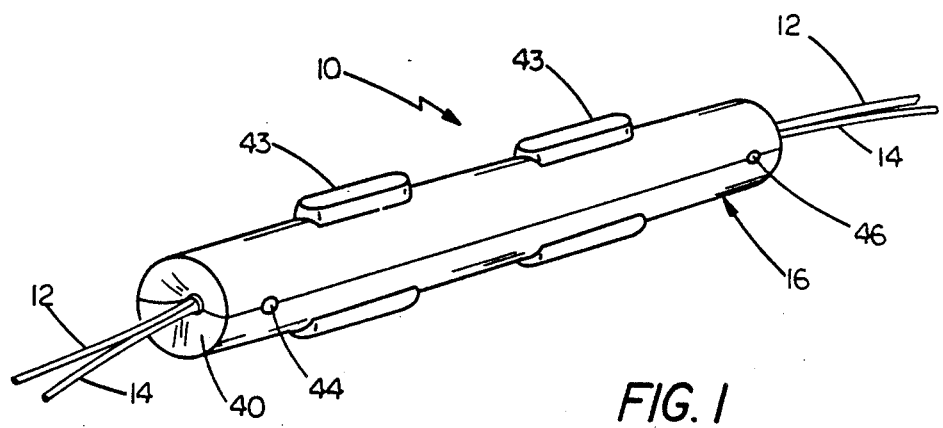
FIG. 1
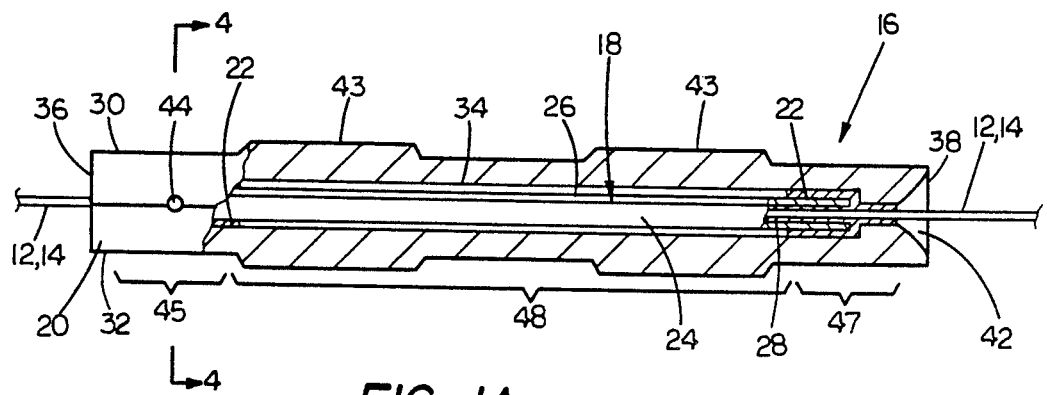
FIG. 1A
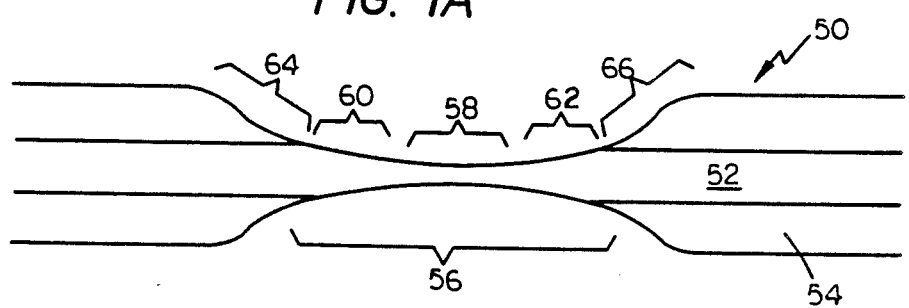
FIG. 2
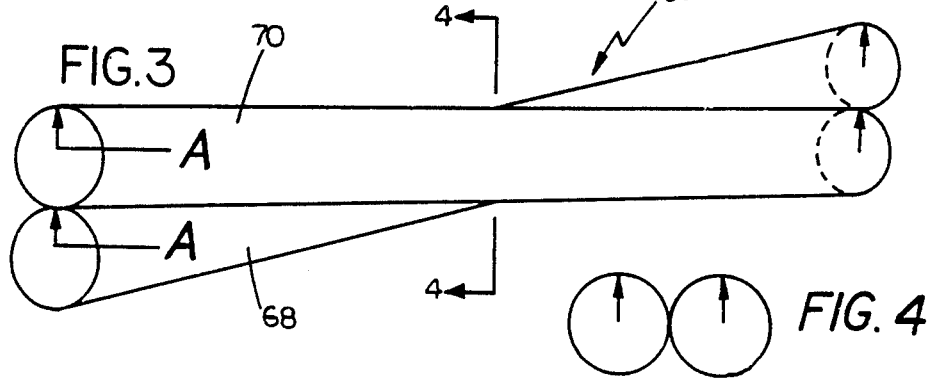
FIG. 3
FIG. 4

FIBER OPTIC COUPLER AND METHOD FOR MAKING SAME

The invention relates to fiber optic devices for coupling light and in particular to low loss access couplers for multimode optical fibers and methods of producing such couplers.

Various methods and constructions for coupling multimode optical fibers have been proposed. For example, Kawasaki et al. U.S. Pat. No. 4,291,940 suggested formation of a relatively low loss access coupler by fusing two fibers together along a short length then heating the fused length and pulling the fibers to form biconical tapers of the core and cladding, or by twisting a portion of the fibers around one another and heating to fuse the fibers, either after formation of the biconical taper, or with tension to form the biconical taper during fusing. Lightstone et al. U.S. Pat. No. 4,449,781 teaches etching the fibers to reduce the cladding thickness. The fibers are then twisted or placed side-by-side, then heated and stretched to fuse the fibers and form biconical tapers of the core and remaining cladding.

SUMMARY OF THE INVENTION

According to the invention, a fiber optic coupler comprises at least two optical fibers each having a core with a cladding material disposed thereabout, the fibers in a limited length coupling region having the cladding material removed and the core exposed, the thickness of the cladding material increasing in smooth transition from immediately adjacent the exposed core in the limited length coupling region, the fibers in the limited length coupling region being joined by coalescing.

Preferred embodiments of the invention have one or more of the following features. In the limited length coupling region, a portion of the core is removed, the core diameter in the coupling region being less than the core diameter in regions adjacent thereto, the outer diameter of the core decreasing in smooth transition from immediately adjacent the cladding material, preferably at least 4% of the outer diameter of the core is removed in the coupling region. The material of the core is removed by etching; cladding material is removed by etching or by solvent action. The coupler is in the form of a star coupler comprising a plurality of optical fibers joined at the limited length coupling region, preferably in the limited length coupling region, the joined fibers are necked down abruptly in a manner to cause light transmitted therethrough to be randomized. Prior to removal of the cladding material, the core and cladding material of at least one fiber is biconically tapered by drawing. The optical fibers may be joined in generally parallel, side-by-side relationship, in crossed relationship, or in twisted relationship. At least one of the coupled fibers has a biconical tapered region created by drawing the respective ends of the fibers apart. A plurality of said fibers are joined by braiding. The fiber optic coupler has constant azimuthal angle, the coupler comprising at least two optical fibers crossed and joined in a coupling region, or the fiber optic coupler comprises at least two optical fibers crossed and joined in a coupling region, the optical fibers having no stored torsion.

According to another aspect of the invention, a method for forming a fiber optic coupler comprises providing at least two optical fibers each having a core with a cladding material disposed thereabout, in a limited length region of each fiber, removing the cladding material to expose the core in a manner whereby the cladding material immediately adjacent the exposed core increases in thickness in smooth transition, and joining the exposed cores of the optical fibers in the limited length region by coalescing whereby light transmitted through the fibers is coupled in the coalesced region.

Preferred embodiment of this aspect of the invention include one or more of the following features. The method further comprises removing, in the limited length coupling region, a portion of the core in a manner whereby the outer diameter of the core decreases in smooth transition from immediately adjacent the cladding material. At least 4% of the outer diameter of the core in said coupling region is removed, e.g., by etching. The cladding material is removed by etching, or by solvent action. To form a star coupler, a plurality of optical fibers are joined at the limited length coupling region, and, in the limited length coupling region, the fibers are necked down abruptly in a manner to cause light transmitted therethrough to be randomized. The method comprises drawing the core and cladding material of at least one fiber into a biconical taper prior to removing the cladding material. The optical fibers may be joined in generally parallel, side by-side relationship, or in twisted relationship.

In still another aspect of the invention, a method of forming an optical coupler comprises: a. mounting a first fiber in a first fixture in a manner to at least minimize rotation of the first fiber and thus ensure the first fiber is in neutral condition; b. arranging a second fiber to lie in intimate contact with the first fiber in a coupling region, the second fiber so arranged in a manner to at least minimize rotation of the second fiber and thus ensure the second fiber is in neutral condition; and c. with the fibers taut, applying heat to the coupling region to fuse the fibers.

Preferred embodiments of this aspect of the invention may include having the second fiber mounted in a second fixture and the method comprises the further step of inverting the second fixture holding the second fiber onto the fixture holding the first fiber with the fixtures in registration to cause the fibers to lie in intimate contact in a coupling region. Also, during fusing of the fibers, the respective ends of the fibers are drawn apart to create a biconical tapered region. A plurality of fibers are joined by braiding.

According to still another aspect of the invention, a fiber optic coupler has constant azimuthal angle, the coupler comprising at least two optical fibers crossed and joined in a coupling region; and, in another aspect, a fiber optic coupler comprising at least two optical fibers crossed and joined in a coupling region, the optical fibers having no stored tension.

These and other features and advantages of the invention will be apparent from the following description of a presently preferred embodiment, and from the claims.

PREFERRED EMBODIMENT

We first briefly describe the drawings.

FIG. 1 is a perspective view of an optical fiber coupler of the invention disposed in a protective package, while FIG. 1A is a side view partially in section thereof;

FIG. 2 is a side section view of one embodiment of an optical fiber for use in forming the coupler package of the invention;

FIG. 3 is a plan view of a pair of optical fibers in crossed relationship;

FIG. 4 is an end section view of the crossed optical fibers at the line 4—4 of FIG. 3;

DETAILS OF PREFERRED EMBODIMENTS

Figure 5:
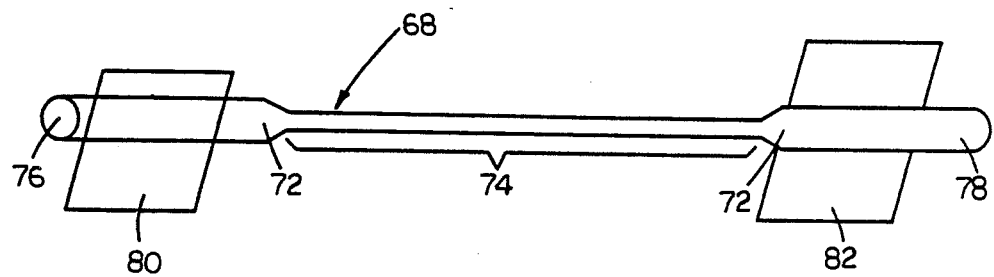
FIG. 5 is a somewhat diagrammatic representation of a first optical fiber mounted for forming a coupler of the invention and FIG. 6 is a similar view showing a pair of fibers mounted for forming the coupler.

Referring to FIGS. 1 and 1A, an optical fiber unit 10 consists of associated optical fibers 12, 14 fused to form an optical coupler and a protective package 16 assembled about the fibers in the area of their association.

The protective package 16 assembled about the coupled fibers consists of an internal protective body 18, an outer protective body 20 and an intervening mass of relatively soft uniting material 22.

The internal protective body 18, about 0.05 inch ×0.05 inch and 1.0 inch long, is formed of a material selected for characteristics of hardness and coefficient of thermal expansion substantially matched to that of the fibers to avoid unbalanced stresses during use. Use of the same material as the fibers is preferred. This internal protective body 18 includes a lower segment, or receiver, 24 and an upper segment, or cover, 26. The lower segment 24 defines a preformed channel 28 sized to receive the fibers in relatively close fit, e.g., for fibers 0.009 inch diameter, channel 28 is 0.021 inch wide and 0.013 inch deep. The fibers, disposed in this channel, are bonded to the body segment 24 using an adhesive selected for hardness and minimum thermal expansion, e.g., UV curable epoxy, and the cover 26 is secured in place.

The outer protective body 20, about 0.145 inch diameter by 1.2 inch long, comprises two opposed segments 30, 32 formed by injection molding. These segments are of a substance less brittle than the internal protective body, e.g., they are made of glass-filled nylon, having a Young's Modulus of about 10 psi, for toughness. They are color-coded to indicate the optical characteristics of the associated fibers, e.g. a package having black and red outer segments may indicate a 20/80, 850 nanometer coupler. The outer protective body defines a recess 34 sized to receive and support the internal protective body with a clearance of about 0.005 to 0.010 inch on all sides, the optical fibers extending out of the outer body via ports 36, 38. To provide stress relief for the fibers, the outlet surfaces 40, 42 defined by the outer protective body along the length of the fibers are constructed to closely surround the fibers as they emerge from the internal protective body, then curve outwardly away from the fibers on radius, R, selected to be greater than the radius at which the fiber will break, e.g., about 3/16 inch. Fiber optic unit mounting pads 43 are also provided on the external surface of the outer body.

The outer protective body segments are assembled about the internal protective body and bonded together, e.g., with adhesive or by ultrasonic welding. A relatively soft material, e.g., 3110 RTV silicone elastomer polymer (sold by Dow corning of Midland, Mich.), is injected via ports 44, 46 to fill segments 45, 47 of the unoccupied space of recess 34, each about 10% of the total length of the recess. The material in segments 45 and 47 surrounds the optical fibers and the internal protective body, fills the gap between the internal and outer protective body and seals the ends of the protective package. This material provides a degree of isolation from shock or rough handling. (A limited degree of outward leakage of resin material may occur via ports 36, 38 (about 0.020 inch diameter), around the fibers, with the beneficial effect of providing additional stress relief.) The middle segment 48 of recess 34 (about 80% of its length) surrounding the center portion of the internal protective body does not fill with resin, thus leaving an air gap that prevents force-transmitting contact between the internal body and recess-defining walls of the outer body in the center of the package where maximum deflection of the unit would occur under force exerted from the outside. After injection, the silicone resin is cured to complete the unit.

Referring now to FIG. 2, an optical fiber 50 for use in forming a coupler of the invention consists of a core 52 of constant diameter with a cladding material 54, also of constant diameter, disposed thereabout. Over a limited length region 56, the cladding material 54 is completely removed to expose the core and a portion of the core diameter, e.g., at least about 4%, i.e., about 2 microns of a 50 micron diameter core, is removed as well. The transition of the diameter of the core between its narrowest point, region 58, and the regions 60, 62 adjacent the cladding, and the transition of the diameter of the cladding therebeyond, regions 64, 66, are smooth throughout, without any sharp curves or rough edges. This pattern is achieved by controlling the characteristics of the removal process. Preferably, for a glass fiber, the cladding and core are removed quickly by acid etch, and the smooth transition is achieved by locally controlling the etch time, the temperature and/or concentration of the etchant. It is important not to have an abrupt end to the cladding.

The fibers so prepared are then joined by coalescing over the limited length region, i.e., by slightly to fully fusing of the respective fibers together, to form an optical coupler. (The coupling relationship may be achieved by crossing the fiber, as described more fully below, or may be achieved by other procedures, e.g., twisting the fibers or disposing them in side-by-side relationship.)

For the resulting coupler, the air surrounding the coupled core has a lower refractive index than typical cladding material, and the energy-carrying capacity of the coupler in the fused limited length region has been found to be increased, e.g., by as much as a factor of 5, over the energy carrying capacity of prior art couplers in which the cladding is not removed.

The resulting coupler is also shorter in length and has a smaller effective diameter than prior art couplers of equivalent design. This permits a sharper taper and coupling occurs over a shorter length. The coupler also has lower light loss due to the tighter light-guiding effect of the surrounding air. The coupler is also environmentally more stable because a shorter length of coupled region is exposed.

A twisted fiber coupler is formed using two fibers laid normally side by side and both rotated about a common axis simultaneously, so that both fibers are present and rotation results in the fibers winding around each other. It also results in a twisting of each fiber around its own axis. The fibers must bend to accommodate each other as one passes over the other.

A method for forming a cross coupler 69 of the invention, using the fiber of the invention just described or other typical fibers, will now be described. Referring to FIGS. 3 and 4, one fiber 70 is overlaid on top of another fiber 68. Looking at the end of the fibers, and considering it like the fact of a clock, a stripe located at 12:00 o'clock at one end of the coupler will remain at 12:00 o'clock at the far end of a crossed coupler. (In a twisted coupler, the azimuthal orientation will vary continuously and may go through many revolutions.) In a crossed fiber coupler, as shown, even after multiple crosses, the stripe will continue to be oriented identically all the way along the fiber, i.e., the azimuthal angle remains constant throughout. This crossed approach has a number of advantages, e.g., for a single crossing, it is possible to take one fiber, lay it in a fixture, e.g., as shown in FIG. 5, and do special processing on it. When the time comes to insert the second fiber, it can be inserted without disturbing the first fiber. (In a twisted coupler, both the first and second fibers are twisted before fixing the fibers in the fixture.) Another advantage of the single cross in particular is the fact that the process can be easily automated for very efficient coupler manufacture and elimination of a human operator. It is much more simple to make a machine which merely lays one fiber across a second fiber than to make a machine which must grasp both fibers simultaneously and twist them about an axis. Another advantage is that when a fiber is twisted (i.e., is rotated about its own axis), mechanical energy is stored in that fiber. When a torch or other heating element is brought in to create the coupler, that mechanical energy is released as the fiber untwists in the central region where the viscosity is reduced. This sudden untwisting can give rise to a very abrupt change in the azimuthal angle where the fibers first penetrate the heated zone of the torch, and that very abrupt untwisting can result in bending with a resulting significant light loss. If the fibers are crossed, there is no axis rotation of the fiber when the torch is brought in because the fiber is already untwisted and there is no substantial stored rotational energy in the fibers. The crossed coupler, therefore, is subject to lower loss, e.g., with losses less than several tenths of a decibel. Also, a twisted coupler typically must be longer than a crossed coupler (e.g., crossed couplers may have a length on the order of 1 cm, with the actual heated region being about two or three millimeters), so that the twist per unit length is sufficiently small and the effect of any residual untwisting is minimized.

The axis twist is also extremely important when it pertains to polarization-preserving fibers in which there is a preferred axis of polarization. The fundamental purpose of these fibers is to preserve the polarization of light. Light entering the fiber along one of the principle axes is to remain along that principle axis throughout the length of the fiber. If a relatively abrupt twist is introduced in that fiber, the twist can become dominant and the light no longer maintains the polarization of the light along the original birefringent axis. The crossed approach does not, to a first order, affect or change the birefringence due to torsion of the axis because there is little or no axis torsion. In contrast, twisting may distort the birefringence even before the fiber is heated and most definitely will distort it and destroy its properties after it has been heated.

Referring again to FIG. 3, two fibers 68, 70 are shown assembled together in a pre-coupler configuration with the fibers crossed (as opposed to twisted). A small indication arrow on each end face of the fibers shows that the arrow, A, is in the same orientation on the left and right side. In any arbitrary cross section (FIG. 4), the arrows are in the original orientation, and that original orientation is maintained all the way along.

To form a coupler using the method of the invention, glass clad fibers 50 (FIG. 2) are obtained. The exterior buffer coating is removed. (This approach works for other fiber constructions such as polymer fibers or glass polymer combinations.) In general, material is removed down to the point of reaching the optical cladding. As an optional step, in addition to removal of the cladding, some of the core may also be removed, e.g., as described above. This approach is valid for both single mode and multi-mode technologies, although it is very difficult to handle a single mode fiber in which only the core remains. One or both of the fibers is installed into the fixture that is used for making the coupler.

Figure 6:
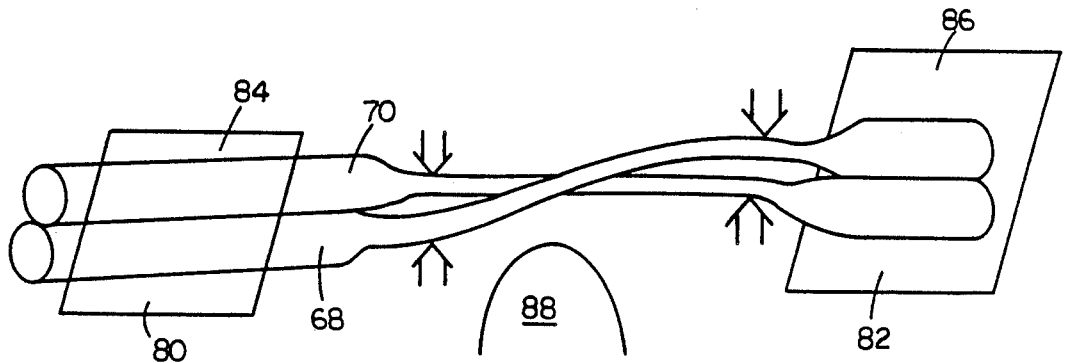

In FIG. 5, one fiber 68 is comprised of two portions, a full diameter portion 72 at each end and a central region 74 from which the fiber will be formed into a coupler. The central region may or may not be etched or otherwise processed. In FIG. 5, the fiber has an etched region in which the cross-sectional diameter of the fiber has been reduced. The ends 76, 78 of the fiber 68 are mounted in fixtures 80, 82, movable inwardly or outwardly during coupler fabrication. (The fixtures simultaneously move outward in a symmetrical fashion from a center region at which the heat is applied.) In FIG. 5, a single fiber is positioned for additional processing if desired. For instance, the operator inspects the fiber for dirt or other defects before installing the second fiber, shown in FIG. 6.

The constant azimuthal angle, crossed fiber configuration with a single fiber (FIG. 5), is achieved by allowing one end of the fiber to be unconstrained prior to insertion into the fixture. The preferred approach is to have the operator hold one end of the fiber 76 with the other end 78 suspended freely so that inherent unwinding of the fiber occurs to its neutral stress condition with constant azimuthal angle throughout its length with no residual stored mechanical energy in the fiber. Those angles have reached the totally neutral state in a relaxed condition.

The operator places the fiber 68 on the fixture 80 by grasping the free end and being careful not to rotate the fiber as it is placed in the fixture, or by bringing the fixture up to the vertically suspended fiber and having the fixture grasp the fiber directly without inducing a rotation. That process assures that the fiber is in its neutral condition denoted by the crossed approach.

In order to achieve the crossed relationship, one fixture 84, 86 is inverted with respect to the second fixture 80, 82, and then placed directly on top of it. Typically, the fibers 68, 70 are in a horizontal configuration so one fixture would be beneath fiber 68, and the second fixture would be above fiber 70. When the two fibers are brought together, there is a fixture above and below. The fixtures register to ensure that the fixtures are located properly with respect to each other.

There is a slight amount of axial tension preferred prior to fabrication of the coupler because this axial tension causes the fibers to be taut and relatively straight. That tension can be applied when the fiber is mounted in the fixture, or it can be applied after the two fixtures have been aligned by causing one or both of the movable fixtures to retract to apply tension to the fibers. The crossing of the two fibers assures intimate contact between the two fibers in the region where the torch 88 is brought in to heat the fibers. In addition to the crossing of the fibers, additional forces may be applied at the sites shown by the double arrows in FIG. 6 which push the fibers together near the outer regions of the heated zones so as to assure intimate contact of the fibers throughout the entire heated zone. Even though there is an axial tension, the crossing operation causes a slight lateral force that creates a slight bend in the axis of the fibers. In fact, it is the bend in combination with the axial force which causes the intimate contact of the two fibers. Bending increases the tension and therefore increases the intimacy of contact.

In the preferred assembly procedure, the fiber diameter at the time of fabrication is about 50 microns total diameter. The distance between the fixtures 80/84, 82/86 (FIG. 6) is typically on the order of 2 cm. The bend in the fiber must be enough to accommodate a 50 micron fiber crossing over a second 50 micron fiber, and corresponds to a maximum displacement at the height of the bend of about 25 microns from rectilinear fiber. A displacement of 25 micron over a distance of 1 cm would correspond to an angle of about 2.5 milli-radians, a very small angle virtually undetectable without sophisticated measuring equipment.

When the drawing is begun, the tension in the fiber is typically reduced because the fibers soften. The tension is then determined by the heat of the source and the draw speed of the fixtures. Typically, the fibers are drawn such that the distance between the fixtures increase by about 4 mm during the drawing process. After the desired coupling ratio has been achieved, the flame is removed, the fixture motions are stopped, and the coupler is packaged, e.g., in the coupler package as described above in regard to FIGS. 1 and 1A.

In one procedure, as described above, the optical fiber is etched to remove all the cladding and part of the core. In other typical procedures, a fiber commercially available having an outside diameter of 125 microns before etching is etched down to a diameter of approximately 50 microns, retaining a cladding layer of considerable thickness, i.e., the core of a single-mode fiber, about 8 microns in diameter, is still embedded in that 50 micron etched fiber. In a similar process, couplers are made from fibers which have not been etched at all, providing a 125 micron outside diameter in the coupler prior to draw.

If the fiber has a glass core and plastic cladding, the process is modified to the extent that instead of etching away the cladding, the polymer cladding will be dissolved with a solvent or mechanically stripped. The cores are then crossed and fused in the fashion as discussed for the all-glass fiber system. If the fiber is all plastic, the cladding may, if preferred, be dissolved with a solvent, or it may be left intact, and the fibers crossed using fixturing identical to that discussed previously. Heating to create the coupler may be done with a less intense heat source, such as a heated wire.

The extension of the cross technique to three or more fibers is straightforward by using a braiding approach in which none of the axes of the fibers is rotated, i.e., each fiber is individually positioned to have no net torsion. When one goes to more than three fibers, the fibers still can be arranged so that each fiber is individually aligned along its neutral axis through the means for interleaving these fibers.

One of the ways in which a larger, multi fiber coupler can be made using the cross technique is to take, e.g., three fibers which have been interleaved suitably without orienting the fiber or without twisting the fiber axis. These three fibers can be fused to create a fiber bundle. Successive fiber bundles can be treated as a single fiber, and interleaved with other bundles to create a large hierarchy of crossed untwisted fibers for a large star coupler.

The invention can be applied to a polarization maintaining fiber which has two principal axes, distinguished from each other by internal structural elements of the fiber. The function of such a fiber is to maintain light transmitted into the fiber along one polarization in that polarization. If the axis of such a fiber is twisted severely, the fiber may lose its ability to maintain the polarization of light traveling through it. Even if a gentle twist is put into the fiber such that it is able to sustain the polarization in the same orientation, when that fiber is subsequently heated, e.g., to make a coupler, that initial twist can give rise to a rapid twist in the heated region where all the twist stresses that are built up are quickly relieved in the very localized heated region, giving rise to total destruction of the fiber's ability to hold polarization. (This ability is known as the extinction ratio of the fiber.) Products made with polarization holding fiber would be various sensors, in particular fiber optic gyros, a sensor that detects rotation. The polarization holding characteristic of the fiber is essential in the application for the gyro in that light must propagate in one and only one mode for the gyro to give an accurate reading of the rotation rate of the fiber optic gyro. If both polarizations coexist, two modes then coexist and give inaccurate rotation results. The crossed technique for making couplers is critical for polarization maintaining fiber because it does not allow the axis of the fiber to be rotated about itself. In other words, the azimuthal angle is maintained such that the fiber always remains in the torsion-free state in a neutral stress condition. Thus when the fiber is heated allowing any residual torsions to relieve themselves using the cross technique, no rotation of the fiber occurs, and the extinction ratio of the fiber is maintained.

In prior art gyros, the technique previously used entailed laying the two fibers side-by-side with no crossing or twisting. This process has disadvantages in that it is difficult to make fixturing to hold the fibers in parallel juxtaposition with sufficient control to get a good yield in the manufacturing process. It is much easier to obtain a high yield if the fibers are crossed because the crossing operation applies limited lateral force to the fibers assuring that they contact when they are heated and thus that they are fused.

The crossed fiber approach eliminates a failure mechanism present in the twisted approach. In the twisted approach, the fiber axes are torsioned, and that torsion is relieved when a heat source is brought in to soften the glass. When the heat source is applied in the twisted approach, the fiber can orient back to its neutral condition, and in so doing the two fibers can roll around each other giving rise to severe distortion of the fibers and bends which can be so abrupt as to cause light to escape from the fiber at those points. This problem is probably more severe in larger diameter fibers but it may reduce yield or increase loss in a twisted fiber coupler.

A second approach to the crossed coupler involves positioning the fiber along its neutral axis such that there is no stored torsional stress in the fiber. A fiber which is crossed over a second fiber may have a very slight axis rotation in order to assure that it lies in minimum stress orientation, whereas the process which we described above for aligning the fiber without axis rotation would not have that slight angle. In order to achieve the slight rotation as required to have the fibers lying in the minimum stress configuration, a fixture can be provided with means allowing very slight rotations of the fibers to null any torsion of the fiber as it rests in the fixture, so that both fibers are truly torsion free where they are held at the fixture. The degree of rotation required to minimize the net torsion to zero will depend on the diameter of the fiber and the length over which the crossing occurs, and in any event will be slight and far less than that which is involved when the fibers are twisted about one another, according to the prior art.

Figure 7:
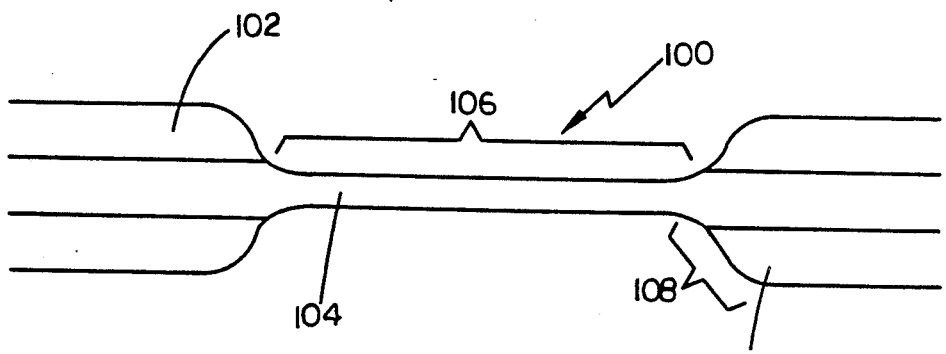
FIG. 7 is a somewhat diagrammatic representation of another embodiment of an optical fiber for forming the coupler of the invention.
Figure 8:
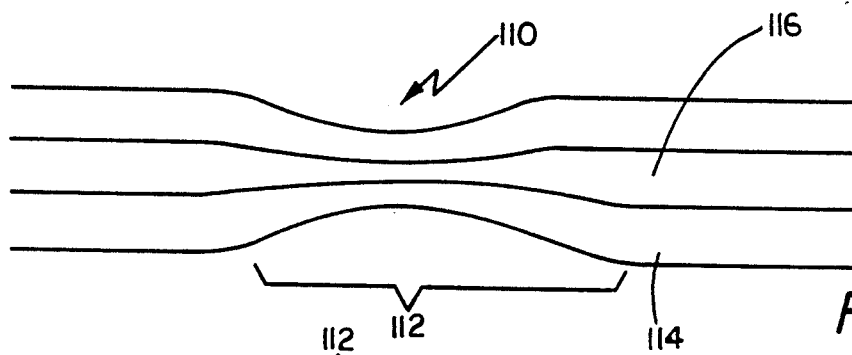
FIGS. 8 and 9 are sequential somewhat diagrammatic representations of still another embodiment of an optical fiber for forming the coupler of the invention.
Figure 9:
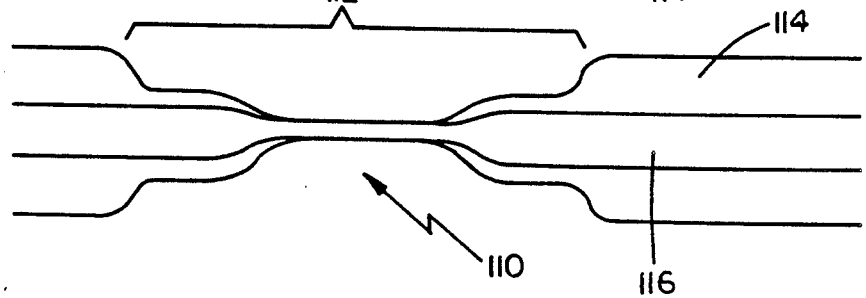

Other embodiments are within the following claims. For example, referring to FIG. 7, an optical fiber 100 is treated, e.g., by etching with acid or gas, by solvent or by ablation, depending upon the nature of material to be removed, to remove the cladding layer 102 and a portion of core 104. As shown in this embodiment, the core may be removed uniformly over a major portion 106 of its exposed length, but still with smooth transition regions 108 of core and cladding. Also, as shown in FIGS. 8 and 9, the optical fiber 110 may be heated and biconically tapered, e.g., in region 112, prior to treatment to remove the cladding 114 and a portion of the core 116.

Figure 10:
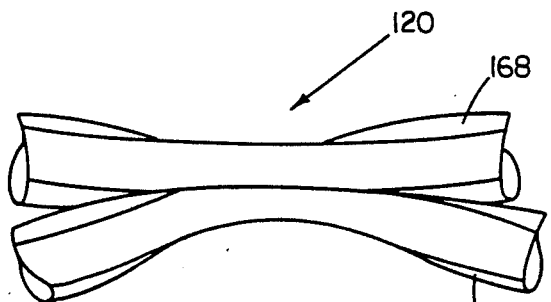
FIGS. 10 and 11 are somewhat diagrammatic representations of couplers of the invention formed by joining the fibers side-by-side (FIG. 10) or by twisting (FIG. 11)
Figure 11:
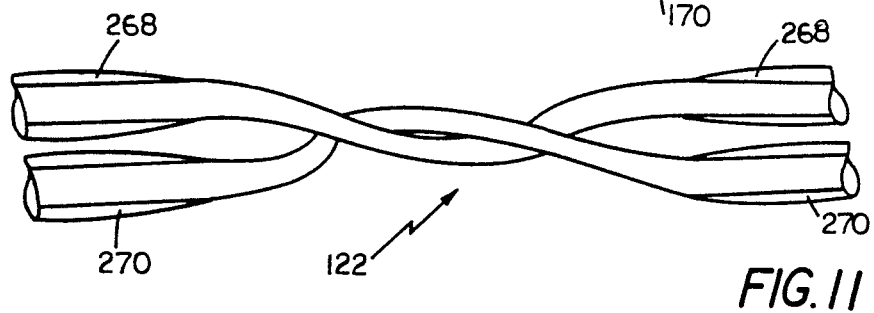

The optical fibers etched to expose the core regions may be employed to form couplers of configuration other than crossed relationship. For example, fibers 168, 170 in coupler 120 (FIG. 10) are shown joined in side-by-side relationship and fibers 268, 270 in coupler 122 (FIG. 11) are shown joined in twisted relationship.

Figure 12:
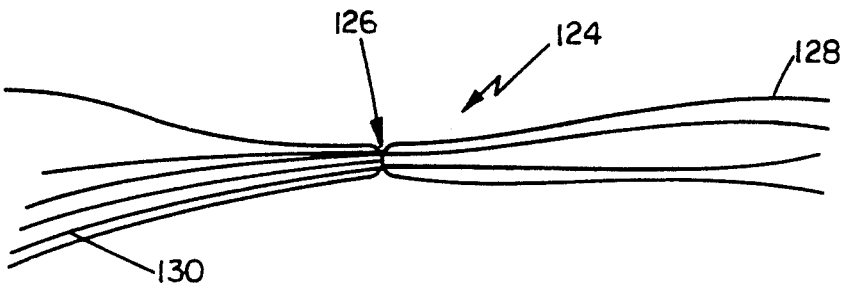
FIG. 12 is a somewhat diagrammatic representation of a star coupler of the invention.

Also, referring to FIG. 12, a star coupler 124 of a multiplicity of optical fibers etched to expose a limited length region of the core are joined in region 126. Region 126 is heated and the ends 128, 130 of the coupler drawn quickly apart to cause the coupler to neck-down abruptly in a manner to cause light transmitted therethrough to be randomized.

What is claimed is:

1. A fiber optic coupler comprising at least two optical fibers each having a core with a cladding material disposed thereabout, said fibers in a limited length coupling region having the cladding material fully removed, the core fully exposed and at least 4% of the outer diameter of the core of at least one of said fibers removed in said coupling region, such that the core diameter in the coupling region is less than the core diameter in regions adjacent thereto, the outer diameter of said core decreasing in smooth transition from immediately adjacent the cladding material, and the thickness of the cladding material increasing in smooth transition from immediately adjacent the exposed core in the limited length coupling region, said fibers in said limited length coupling region extended along the sides of each other in crossed relationship, having a constant azimuthal angle and being joined by coalescing.

2. The fiber optic coupler of claim 1 wherein the material of said core of at least one of said fibers is removed by etching.

3. The fiber optic coupler of claim 1 wherein said cladding material is removed by etching.

4. The fiber optic coupler of claim 1 wherein said cladding material is removed by solvent action.

5. The fiber optic coupler of claim 1 in the form of star coupler comprising a plurality of optical fibers joined at said limited length coupling region.

6. A fiber optic coupler in the form of star coupler comprising a plurality of optical fibers each having a core with a cladding material disposed thereabout, said fibers in a limited length coupling region having the cladding material removed and the core exposed, the thickness of the cladding material increasing in smooth transition from immediately adjacent the exposed core in the limited length coupling region, said fibers in said limited length coupling region being joined by coalescing and wherein, in said limited length coupling region, the joined fibers are necked down abruptly in a manner to cause light transmitted therethrough to be randomized.

7. A fiber optic coupler comprising at least two optical fibers each having a core with a cladding material disposed thereabout, said fibers in a limited length coupling region having the cladding material removed by etching and the core substantially exposed, wherein, prior to removal of said cladding material, said core and cladding material of at least one fiber is biconically pre-tapered by drawing, the thickness of the cladding material of said fiber, as a result of etching the cladding of the pre-tapered fiber, increasing in smooth transition from immediately adjacent the exposed core in the limited length coupling region, said substantially exposed cores of said fibers in said limited length coupling region being joined by coalescing.

8. The fiber optic coupler of claim 1 wherein at least one of said coupled fibers has a biconical tapered region created by drawing the respective ends of the fibers apart.

9. The fiber optic coupler of claim 1 or 8 wherein a plurality of said fibers are joined by braiding.

10. A multimode fiber optic coupler, said coupler comprising at least two optical fibers each having a core with a cladding material disposed thereabout, said fibers in a limited length region having the cladding material removed and the core substantially exposed, the thickness of the cladding material increasing in smooth transition from immediately adjacent the substantially exposed core in the limited length region, the cores of said fibers in said limited length region extending generally lengthwise and substantially symmetrically along the sides of each other in crossed relationship, each fiber having a constant azimuthal angle, and being joined by coalescing to provide effective coupling of light in a coupling region.

11. A multimode fiber optic coupler comprising at least two optical fibers each having a core with a cladding material disposed thereabout, said fibers in a limited length region having the cladding material removed and the core substantially exposed, the thickness of the cladding material increasing in smooth transition from immediately adjacent the substantially exposed core int eh limited length region, the core of said fibers in said limited length region extending generally lengthwise and substantially symmetrically along the sides of each other in crossed relationship and being joined by coalescing to provide effective coupling of light, and wherein the fibers joined in said region have no stored torsion.

12. A method for forming a fiber optic coupler comprising:

providing at least two optical fibers each having a core with a cladding material disposed thereabout;

in a limited length coupling region of each fiber, removing the cladding material to fully expose said core in a manner whereby the cladding material immediately adjacent the exposed core increases in thickness in smooth transition;

removing, in the limited length coupling region, a portion of the core in a manner whereby the outer diameter of said core decreases in smooth transition from immediately adjacent the cladding material, said step including removing at least 4% of the outer diameter of the core of at least one of said fibers in said coupling regions arranging the fibers along side each other in crossed relationship with a constant azimuthal angle; and joining the exposed ores of said optical fibers in the limited length region by coalescing whereby light transmitted through said fibers is coupled in the coalesced region.

13. The method of claim 12 comprising removing the material of said core of at lest one of said fibers by etching.

14. The method of claim 12 comprising removing said cladding material by etching.

15. The method of claim 12 comprising removing said cladding material by solvent action.

16. A method for formation of a a star coupler comprising providing a plurality of optical fibers each having a core with a cladding material disposed thereabout;

in a limited length region of each fiber, removing the cladding material to expose said core in a manner whereby the cladding material immediately adjacent the exposed core increases in thickness in smooth transition;

joining the exposed cores of said optical fibers in the limited length region by coalescing whereby light transmitted through said fibers is coupled in the coalesced region; and in said limited length coupling region, necking down the fibers abruptly in a manner to cause light transmitted therethrough to be randomized.

17. A method for forming a multimode fiber optic coupler comprising:

providing at least two optical fibers each having a core with a cladding material disposed thereabout;

drawing said core and cladding material of at least one said fiber into a biconical taper;

thereafter, in a limited length region of each fiber, removing the cladding material to substantially expose said core in a manner whereby the cladding material immediately adjacent the substantially exposed core increases in thickness in smooth transition;

arranging the substantially exposed cores of said fibers to extend generally lengthwise and substantially symmetrically along the sides of each other in crossed relationship;

joining the substantially exposed cores of said optical fibers in the limited length region by coalescing whereby light transmitted through said fibers is coupled effectively int he coalesced region.

18. The method of forming an optical coupler comprising:

a. mounting a first fiber in a first fixture in a manner to at least minimize torsional rotation of the first fiber and thus ensure said first fiber is in neutral condition, b. arranging a second fiber to lie in intimate cross contact with said first fiber in a coupling region, said second fiber so arranged in a manner to at least minimize torsional rotation of the second fiber and thus ensure said second fiber is in neutral condition; and c. with said fibers taut, applying heat to said coupling region to fuse said fibers.

19. The method of claim 18 wherein said second fiber is mounted in a second fixture and said method comprises the further step of inverting said second fixture holding the second fiber onto the fixture holding the first fiber, with the fixtures in registration to cause the fibers to lie in intimate contact in a coupling region.

20. The method of claim 18 or 19 wherein during fusing of said fibers the respective ends of the fibers are drawn apart to create a biconical tapered region.

21. The method of claim 18 or 19 wherein a plurality of fibers are joined by braiding.

22. A fiber optic coupler comprising:

at least two optical fibers each having a core with a cladding material disposed thereabout, said fibers in a limited length coupling region having the cladding material removed and the core exposed, the thickness of the cladding material increasing in smooth transition from immediately adjacent the exposed core;

said fibers crossing one another in a manner so as to maintain a constant azimuthal angle within each fiber; and said fibers joined in said coupling region by coalescing.

23. A fiber optic coupler comprising:

at least two optical fibers each having a core with a cladding material disposed thereabout, said fibers in a limited length coupling region having the cladding material removed and the core exposed, the thickness of the cladding material increasing in smooth transition from immediately adjacent the exposed core;

said fibers crossing one another in a manner so as to not store an tension and;

said fibers joined in said coupling region by coalescing.

24. The fiber optic coupler of claim 1 formed by fusing and drawing said fibers during coalescing.

25. The fiber optic coupler of claim 7 wherein each of said fibers is biconically tapered by drawing prior to removal of said cladding.

* * * * *

UNITED STATES PATENT AND TRADEMARK OFFICE
CERTIFICATE OF CORRECTION

PATENT NO. : 4,997,247
DATED : March 5, 1991
INVENTOR(S) : David Stowe

It is certified that error appears in the above-identified patent and that said Letters Patent is hereby corrected as shown below:

Col. 5, line 13; "fact" should be --face--;

Col. 10, line 66; "int eh" should be --in the--;

Col. 11, line 25; "ores" should be --cores--;
line 30; "lest" should be --least--;

Col. 12, line 4; insert --and-- at end of line;
line 8; "int he" should be --in the--;
line 15; "cross" should be --crossed--.

Signed and Sealed this

Tenth Day of November, 1992

*Attest:*

DOUGLAS B. COMER

*Attesting Officer*  *Acting Commissioner of Patents and Trademarks*